(12) United States Patent
Wanibuchi

(10) Patent No.: US 7,619,389 B2
(45) Date of Patent: Nov. 17, 2009

(54) CHARGE CONTROL DEVICE FOR A SECONDARY BATTERY

(75) Inventor: Tohru Wanibuchi, Akashi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/270,468

(22) Filed: Nov. 10, 2005

(65) Prior Publication Data
US 2006/0238166 A1 Oct. 26, 2006

(30) Foreign Application Priority Data
Apr. 22, 2005 (JP) ............................. 2005-125361

(51) Int. Cl.
*H02J 7/00* (2006.01)
(52) U.S. Cl. ...................... 320/128; 320/129; 320/132; 320/136; 324/432; 324/433
(58) Field of Classification Search ................. 320/118, 320/129, 132, 136, 137, 149, 150, 163, 152–155, 320/157–159, 112, 114, 128; 324/431–433
See application file for complete search history.

(56) References Cited

U.S. PATENT DOCUMENTS

| | | | | |
|---|---|---|---|---|
| 3,665,285 A | * | 5/1972 | Mullersman et al. | ........ 320/112 |
| 4,399,510 A | * | 8/1983 | Hicks | ........................ 705/412 |
| 4,670,703 A | * | 6/1987 | Williams | ..................... 320/125 |
| 5,677,944 A | | 10/1997 | Yamamoto et al. | |
| 2003/0076074 A1 | * | 4/2003 | Kawai | ........................ 320/136 |

FOREIGN PATENT DOCUMENTS

| | | |
|---|---|---|
| JP | 7-231294 | 8/1995 |
| JP | 2002-51478 | 2/2002 |
| JP | 2002-78222 | 3/2002 |
| JP | 2002-199616 | 7/2002 |

* cited by examiner

*Primary Examiner*—Edward Tso
*Assistant Examiner*—Arun Williams
(74) *Attorney, Agent, or Firm*—Wenderoth, Lind & Ponack, L.L.P.

(57) ABSTRACT

A charge circuit 6 supplies a charging voltage (Vc) or a charging current to a secondary battery 2, 24 to 26 used for driving an appliance 21; a charged level setting device 5, Sc1 causes the charge circuit 6 to charge the secondary battery 2, 24 to 26 to a predetermined charged level, and detection means 12 detects a charged level of the secondary battery 2; a discharge section 21, 5, Sc1 discharges the secondary battery 2; and control means operates the charge circuit 6 when the predetermined charged level is higher than the detected charged level, and discharges the secondary battery by the discharge section 21, 5, Sc1 when the predetermined charged level is lower than the detected charged level Thus, it is possible to provide a charge control device capable of extending a cycle life of a secondary battery.

13 Claims, 4 Drawing Sheets

CHARGE CONTROL DEVICE FOR A SECONDARY BATTERY

BACKGROUND OF THE INVENTION

1. Field of the Invention

The present invention relates to a charge control device of a secondary battery used for driving an electronic appliance and the like.

2. Description of the Background Art

A rechargeable secondary battery is widely used as a power supply of a portable electronic appliance or an electrical appliance (hereinafter, referred to as a "portable appliance") such as a notebook type personal computer (hereinafter, referred to as a "notebook computer"), a digital video camera, a digital still camera, a mobile telephone and the like. The secondary battery used for the portable appliance needs to have a small size, a light weight, a high capacity, a low memory effect, and a long life. Recently, a lithium ion secondary battery (hereinafter, referred to as a "lithium ion battery") has been developed as a secondary battery which satisfies such demands.

Compared with other small sized secondary batteries such as a NiCad battery or a nickel hydrogen battery, the lithium ion battery has excellent characteristics such as high voltage, high energy density, no memory effect, long cycle life, and high storage capacity. Furthermore, for other characteristics such as high output, safety, and rapid charging capability, the lithium ion battery has similar performance to the NiCad battery or the nickel hydrogen battery.

A discharge capacity, which is measured as a difference in electrical charge between a fully charged state and a fully discharged state, is maximum at an initial stage of use, and the discharge capacity gradually decreases by repeating a charge and discharge of the secondary battery. The number of times of the charge and discharge of the secondary battery performed until the discharge capacity reaches a predetermined value is referred to as a cycle life. In other words, if the discharge capacity decreases to below the predetermined value, the secondary battery is considered to have reached an end of its life even though the secondary battery still can be practically used. The discharge capacity corresponds to a load capacity of the secondary battery per charge, and also corresponds to a usage period of the portable appliance driven by the secondary battery per charge.

From this standpoint, a product of the discharge capacity and the cycle life is determined as a total electrical capacity in which the secondary battery may be operable to function, or as a total operating period of the portable appliance driven by the secondary battery. In the present embodiment below, characteristics of the secondary battery, e.g., a cycle life, used for a portable appliance are described as an example. However, it is to be understood that the present invention is applicable to any portable or fixed electrical appliances driven by the secondary battery. Therefore, the electrical appliance driven by the secondary battery according to the present invention is generically referred to simply as an "appliance".

Generally, a characteristic of the lithium ion battery is that when a charging voltage is high, a charging rate of the battery becomes higher, thus increasing the discharge capacity. In other words, the appliance can be used for a longer time per charge, while the cycle life becomes shorter. On the other hand, when the charging voltage is low, the charging rate becomes lower, thus decreasing the discharge capacity. In other words, the appliance is used for a shorter time per charge, while the cycle life becomes longer. Here, it is known that the total electrical capacity of the secondary battery and the total operating period of the portable appliance driven by the secondary battery can be both improved when the charging voltage is low rather than high. Therefore, there is a proportional relationship between the cycle life and the total electrical capacity of the secondary battery or the total usage period of the portable appliance driven by the secondary battery.

From this standpoint, various charge control devices have been developed in order to extend the cycle life of the secondary battery. In order to extend the cycle life, the Japanese Laid-Open Patent Publication No. 2002-51478 had proposed a charge control device allowing a user to select a charged level through an explicit instruction from the user.

However, since the charged level of the secondary battery significantly varies depending on the condition of use, it is very difficult to select an appropriate charged level in the aforementioned method. For example, when a notebook computer is mainly used for deskwork, mostly being connected with an AC adopter during the usage, a charge capacity of the secondary battery is preferably suppressed in order to extend the cycle life. On the other hand, the notebook computer is irregularly brought out to be used, away from home or the like, without being connected with the AC adopter, the charge capacity of the secondary battery needs to be temporarily increased in order to secure the operating period. For both conditions of use of the secondary battery described above, it is necessary, from a perspective of the user's convenience, that the user can instantly recognize a current condition of use of the secondary battery and rapidly change to a desired charged level (i.e., a predetermined charged level).

Furthermore, for realizing two contrary objects, i.e., (1) extending the operating period of the portable appliance driven by the secondary battery, and (2) extending the cycle life of the secondary battery, the charged level of the secondary battery must be accurately controlled. However, in a conventional control method based on a remaining capacity of the secondary battery, the charged level may not be controlled as desired since a precision for detecting the remaining capacity is reduced as characteristics of the secondary battery vary over time.

SUMMARY OF THE INVENTION

In order to solve the conventional problems described above, an object of the present invention is to provide a charge control device capable of extending a cycle life of the secondary battery.

A charge control device according to the present invention comprises: a charge circuit for supplying a charging voltage or a charging current to a secondary battery used for driving an appliance; charged level setting means for causing the charge circuit to charge the secondary battery to a predetermined charged level; detection means for detecting a charged level of the secondary battery; discharge means for discharging the secondary battery; and control means for operating the charge circuit when the predetermined charged level is higher than the detected charged level, and operating the discharge means when the predetermined charged level is lower than the detected charged level.

The charge control device of the present invention enables a user to immediately recognize a current charged level of the secondary battery, and rapidly change the current charged level to the predetermined charged level. Moreover, the charge control device can accurately control the charged level requested by the user, and clearly present the charged level to the user.

Furthermore, the charge control device includes a temperature detection circuit and means for calculating a usage period, thereby preventing a deterioration of the cycle life of the secondary battery, which is caused by using the secondary battery under high temperature conditions or maintaining the secondary battery in a highly charged state for a long period of use.

Still furthermore, the charge control device includes a circuit for disconnecting a power supply from an external power source to the appliance, thereby rapidly shifting from a high charged level to a low charged level by using a power generated by an operation of the appliance, without adding any special circuit for discharging the secondary battery.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Hereinafter, with reference to FIGS. 1, 2, 3, and 4, a charge control device according to a first embodiment of the present invention is described.

Figure 1:
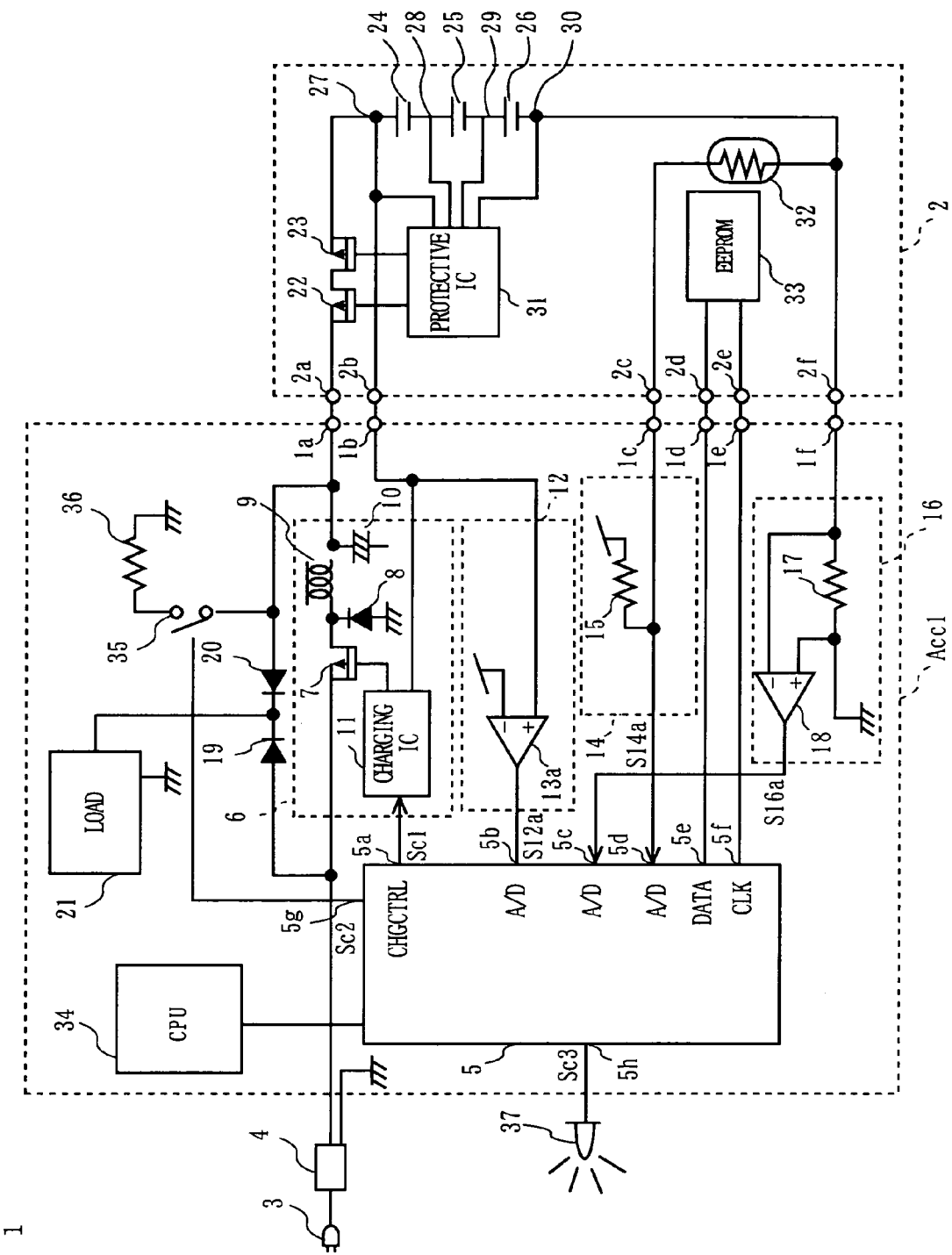
FIG. 1 is a block diagram illustrating a configuration of a charge control device according to a first embodiment of the present invention.

As shown in FIG. 1, a charge control device ACC1 is connected to a battery pack 2, and used for controlling a charged level of the battery pack 2. A terminal 1a, a terminal 1b, a terminal 1c, a terminal 1d, a terminal 1e, and a terminal 1f included in the charge control device ACC1, and a terminal 2a, a terminal 2b, a terminal 2c, a terminal 2d, a terminal 2e, and a terminal 2f included in the battery pack 2, are detachably connected to each other respectively.

The charge control device ACC1 includes a microcontroller 5, a charge circuit 6, a voltage detection circuit 12, a temperature detection circuit 14, a current detection circuit 16, a diode 19, a diode 20, a load 21, a CPU 34, a switch 35, and a discharge resistor 36. A power is supplied at a predetermined voltage to the charge control device ACC1 from an alternating-current commercial power source 3 through a power supply unit 4. The power supply unit 4 may drop the voltage by using a transformer or by using a switching power source. The load 21 is applicable to any appliances driven by the battery pack 2, such as a notebook computer described above.

The microcontroller 5 is preferably a microcomputer and includes a control program inside. The microcontroller 5 generates various control signals based on data outputted from elements of the charge control device ACC1, and controls operations performed by the respective elements of the charge control device.

The charge circuit 6 includes a field effect transistor 7 (hereinafter, referred to as a "FET"), a diode 8, a coil 9, a capacitor 10, and a charging IC 11. The FET 7 is placed in series with an input current and controls the input current. The diode 8 provides a current path when the FET 7 is turned off. The coil 9 and the capacitor 10 apply a smoothed input current to the terminal 1a. The charging IC 11 controls the FET 7 based on a first charge control signal Sc1 (CHGCTRL) outputted from the microcontroller 5.

The voltage detection circuit 12 includes an operational amplifier 13. As described below, the voltage detection circuit 12 detects a terminal voltage of the secondary battery through the terminal 1b, and outputs a voltage detection signal S12a to the terminal 5b (A/D) of the microcontroller 5.

The temperature detection circuit 14 includes a resistor 15. As described below, the temperature detection circuit 14 detects a temperature of the battery pack 2 through the terminal 1c, and outputs a temperature detection signal S14a to the terminal 5d of the microcontroller 5.

The current detection circuit 16 includes a resistor 17 for detecting a charging current through the terminal 1f, and an operational amplifier 18 for detecting a voltage across the resistor 17 and outputting a current detection signal 16a to the terminal 5c (A/D) of the microcontroller 5.

The input side of the FET 7 and the output side of the coil 9 are connected to the load 21 through the diodes 19 and 20, so as to have polarities as shown in FIG. 1 respectively. That is, the diode 19 and the diode 20 are connected back-to-back, and a common cathode connection point of the diode 19 and the diode 20 is coupled to the load 21. Therefore, the load 21 can be operated while charging the battery pack 2.

In addition to the aforementioned terminals 2a to 2f, the battery pack 2 includes a FET 22, a FET 23, a secondary battery cell 24, a secondary battery cell 25, a secondary battery cell 26, a protective IC 31, a thermistor 32, and an EEPROM 33. Each of the secondary battery cells 24, 25 and 26 is a lithium ion battery. The FETs 22 and 23 are placed in series with an input current supplied from the terminal 2a, and connected to a positive (+) terminal of the secondary battery cell 24. The FETs 22 and 23 are both driven by the protective IC 31. The FET 22 controls a charging current, and the FET 23 controls a discharging current.

The secondary battery cells 24, 25 and 26 are connected in series with each other. The protective IC 31 detects voltages of the terminals 27 and 28 connected to both ends of the secondary battery cell 24, the terminals 28 and 29 connected to both ends of the secondary battery cell 25, and the terminals 29 and 30 connected to both ends of the secondary battery cell 26. Each of the terminals 27, 28, 29 and 30 are referred to as a voltage detection terminal. When any of the detected voltages of the secondary battery cells 24, 25 and 26 is higher than a predetermined voltage, i.e., overcharged, the protective IC 31 stops the power supply to the secondary battery cells 24, 25 and 26 by controlling the FET 22. On the other hand, when any of the detected voltages of the secondary battery cells 24, 25 and 26 is lower than the predetermined voltage, i.e., overdischarged, the protective IC 31 stops the power supply to the secondary battery cells 24, 25 and 26 by controlling the FET 23.

There are mainly the following three reasons why the protective IC 31 is also provided in the battery pack 2 together with the charging IC 11 provided in the charge control device ACC1.

A first reason is that when the battery pack 2 is connected to the charge control device ACC1 having the damaged FET 7 or the malfunctioning charging IC 11, and any of the secondary battery cells 24, 25 and 26 is overcharged, the secondary battery pack 2 (the protective IC 31) controls the FET 22, so as to stop the power supply and protect the secondary battery cells 24, 25 and 26.

A second reason is that when the battery pack 2 is connected to the charge control device ACC1 or the load 21, and remains connected for a long period of time, the protective IC 31 controls the FET 23 and disconnects a discharge path, in order to prevent any of the secondary battery cells 24, 25 and 26 from being overdischarged, due to a slight discharge current supplied from the charge control device ACC1 and the load 21.

A third reason is that even when a current exceeding a predetermined value flows due to, for example, a short-circuit of the terminals 2a to 2f of the battery pack 2, the protective IC 31 functions as a short-circuit protection so as to turn the FET 23 off and disconnect a circuit. The OFF state of the FET 23 is maintained until a next charge.

Furthermore, the thermistor 32 is connected in series with the resistor 15 in the temperature detection circuit 14 of the charge control device ACC1, thereby forming a series circuit. The thermistor 32 functions as a component of the temperature detection circuit 14. The thermistor 32 (the temperature detection circuit 14) detects the temperature of each of the secondary battery cells 24, 25 and 26, which are adjacent to one another. The EEPROM 33 stores data provided through the terminals 5e and 5f of the microcontroller 5.

Hereinafter, a charge control operation of the battery pack 2 in the charge control device ACC1 as configured above is described in detail.

When the charge control device ACC1 is connected to the alternating-current commercial power source 3, a power is applied to the load 21 through the diode 19. When the alternating-current commercial power source 3 is disconnected, a power is supplied to the load 21 from the secondary battery cells 24, 25 and 26 through the diode 20. After a charge of the battery pack 2 is completed, the battery pack 2 may be detached from the charge control device ACC1 and connected to the load 21.

The voltage detection circuit 12 detects the voltage across each of the secondary battery cells 24, 25 and 26 through the terminals 1b and 2b, and outputs an analog voltage detection signal S12a. The voltage detection signal S12a is inputted to the microcontroller 5 through the terminal 5b, and converted into a digital value.

The temperature detection circuit 14 outputs an analog temperature detection signal S14a based on a voltage dividing ratio between the resistor 15 and the thermistor 32 whose resistance varies depending on the temperature. The temperature detection signal S14a is inputted to the microcontroller 5 through the terminal 5d (A/D), and converted into a digital value.

The current detection circuit 16 calculates a current value by means of the operational amplifier 18 based on the voltage across the resistor 17, and outputs an analog current detection signal S16a. The current detection signal S16a is inputted to the microcontroller 5 through the terminal 5c, and converted into a digital value.

The microcontroller 5 generates a first charge control signal Sc1, a second charge control signal Sc2, and a third charge control signal Sc3, based on the voltage detection signal S12a, the temperature detection signal S14a and the current detection signal S16a, which have all been converted into digital values, respectively. The first charge control signal Sc1 is outputted to the charge circuit 6 through the terminal 5a, the second charge control signal Sc2 is outputted to the switch 35 through the terminal 5g, and the third charge control signal Sc3 is outputted to a charging mode display LED 37 through the terminal 5h.

The charging IC 11 forming a part of the charge circuit 6 controls the FET 7 based on the first charge control signal Sc1 outputted from the microcontroller 5, so as to supply a constant value of charging current to the secondary battery cells 24, 25 and 26.

Figure 2:
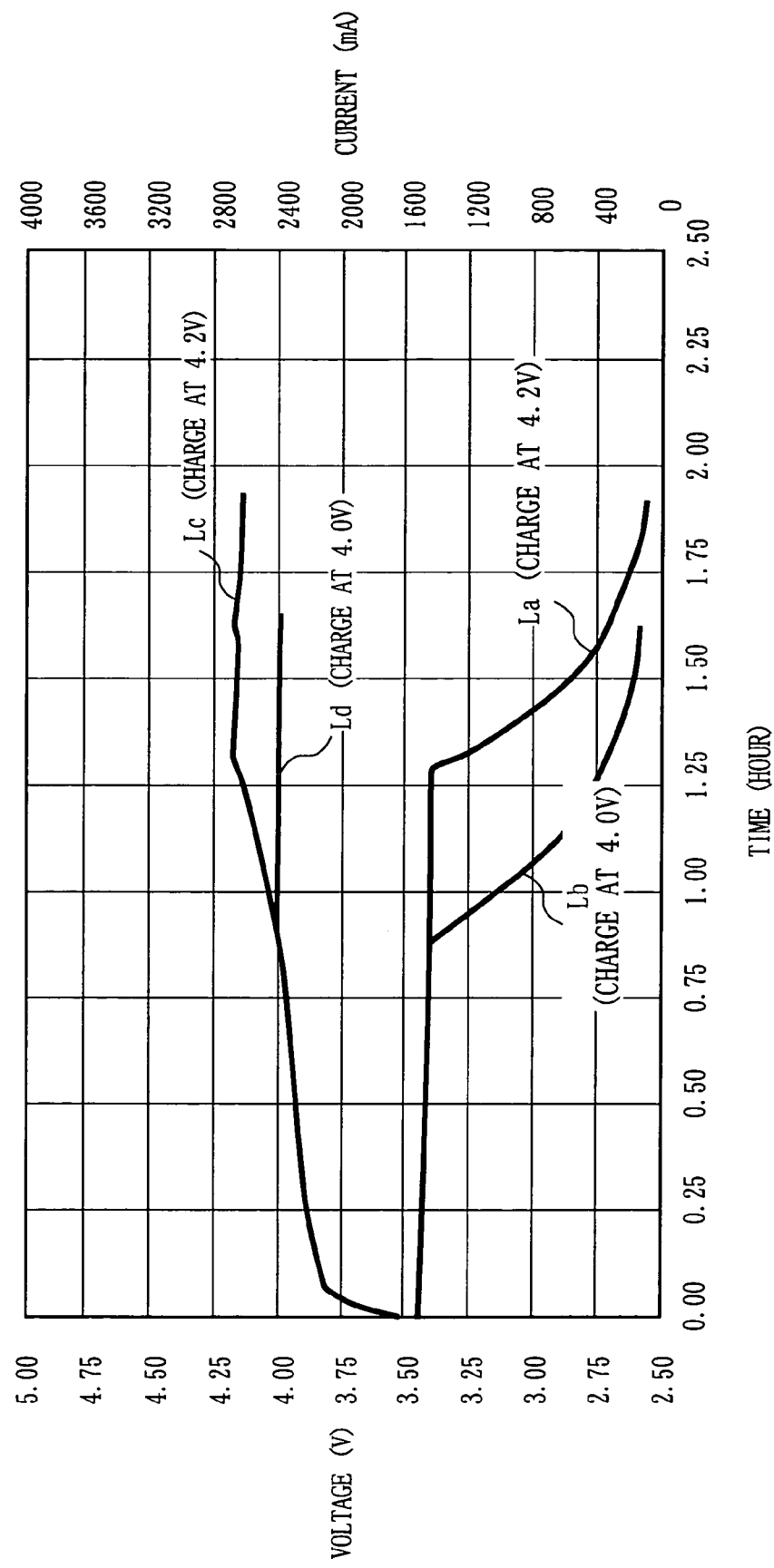
FIG. 2 is a diagram illustrating a charging characteristic of a lithium ion battery to which the charge control device shown in FIG. 1 is applied.

A control of charging current supplied to the battery pack 2 by the charge control device ACC1 is described based on a charging characteristic of the lithium ion battery shown in FIG. 2. In FIG. 2, the horizontal axis represents a charging time (Hour), the left vertical axis represents a charging voltage (V), and the right vertical axis represents a charging current (mA).

Each of curves La and Lb shows the charging current (mA) plotted against the charging time (Hour). Specifically, the curve La shows the charging current characteristic obtained when a secondary battery cell is charged at 4.2V, whereas the curve Lb shows the charging current characteristic obtained when a charging voltage is charged at 4.0V.

Each of curves Lc and Ld shows the charging voltage plotted against the charging time. Specifically, the curve Lc shows the charging voltage characteristic obtained when a secondary battery cell is charged at 4.2V, and the curve Ld shows the charging voltage characteristic obtained when a secondary battery cell is charged at 4.0V.

The microcontroller 5 generates the first charge control signal Sc1 and outputs the signal to the charge circuit 6, so as to supply from the charge circuit 6 an output current, i.e., the charging current Ic, having at the predetermined specific value, as shown by a straight line portion of the curves La and Lb in FIG. 2. Such a charging method of the battery pack 2 by fixing the charging current Ic at the predetermined value (hereinafter, referred to as a "predetermined charging current value Icc") is referred to as constant current charging (hereinafter, referred to as "CC charging").

In such CC charging, the predetermined charging current value Icc is determined in accordance with characteristics of the secondary battery to be charged, such as its charging conditions and its charged level. In one case, the predetermined charging current value Icc is previously set in the control program of the microcontroller 5. In another case, the predetermined current value Icc is determined by the microcontroller 5 reading a charging parameter stored in the EEPROM 33.

The microcontroller 5 controls the FET 7 through the charging IC 11 in the charge circuit 6, and monitors the voltage detection signal S12a and the charging current detection signal S16a during the CC charging. When the voltage of each of the secondary battery cells 24, 25 and 26 reaches a predetermined value (for example, 4.2V per cell), the microcontroller 5, while maintaining the predetermined value, continuously switches the first charge signal Sc1 and/or Sc2 steplessly and/or discretely, so as to gradually decrease the charging current Ic outputted from the FET 7 in the charge circuit 6, as shown by the curve La in FIG. 2. Such a charging method is referred to as constant voltage charging (hereinafter, referred to as "CV charging"). In the CV charging, the output voltage of the charge circuit 6 may be predetermined at 4.2V. The micro controller 5 judges that a battery is in a fully charged state when the charging current Ic becomes lower than the predetermined current value. Thereafter, the microcontroller 5 generates the first charge control signal Sc1, turns the FET 7 off through the charging IC 11 to reduce the charging current Ic to zero, and finishes charging the secondary battery.

In the present embodiment of the present invention, described is a charging method of judging a time of shifting from the CC charging to the CV charging by fixing a predetermined voltage (4.2V in this case) per secondary battery cell. However, as described above, the higher the charging voltage in the CC charging is, the higher the charging rate of the battery becomes. Thus, the appliance can be used for a longer time per charge, but the cycle life is shortened. On the other hand, when the charging voltage is low, the cycle life becomes longer. However, the charging rate becomes lower, and thus the appliance is used for a shorter time per charge.

Figure 3:
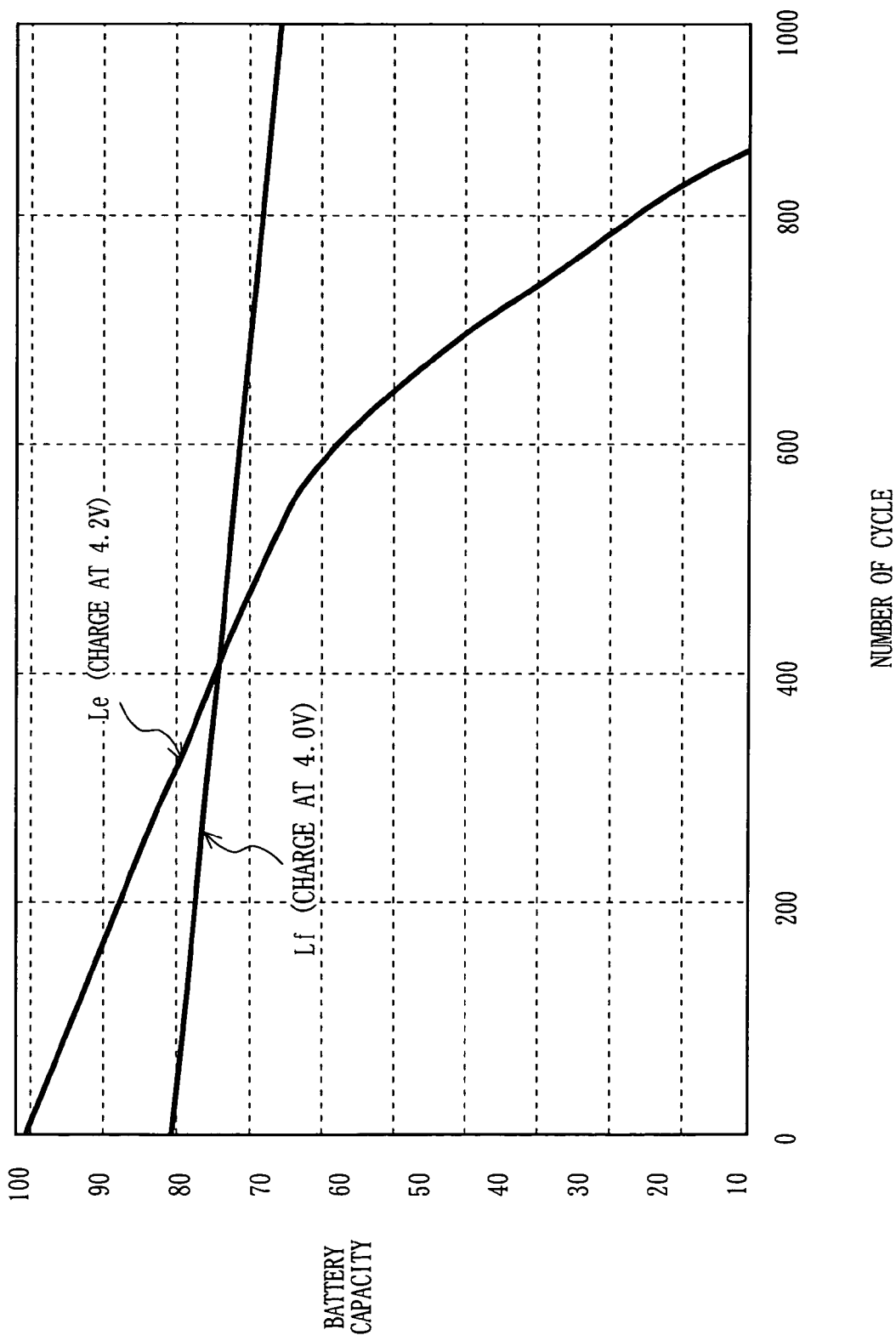
FIG. 3 is a diagram illustrating a charge and discharge cycle characteristic depending on a charging voltage of the lithium ion battery to which the charge control device shown in FIG. 1 is applied.

Next, with reference to FIG. 3, a charge and discharge cycle characteristic of the lithium ion battery depending on different charging voltages is described. In FIG. 3, the horizontal axis represents the number of the charge and discharge cycles (times), and the vertical axis represents a battery capacity (%) of the lithium ion battery. Curve Le shows the charge and discharge cycle characteristic obtained when a voltage is 4.2V in the CV charging, whereas curve Lf shows the charge and discharge cycle characteristic obtained when a voltage is 4.0V in the CV charging. Note that a battery capacity of the lithium ion battery initially CV charged at 4.2V is defined as 100%.

If it is assumed that that a battery life ends when the battery capacity decreases to 50%, the cycle life of the battery charged at 4.2V is approximately 650 cycles as shown by the curve Le, and the cycle life of the battery charged at 4.0V is far beyond 1,000 cycles as shown by the curve Lf. A total electrical capacity (a total operating period) of the secondary battery corresponds to an area enclosed by the curve Le, the curve Lf, the horizontal axis, and the vertical axis in FIG.3. Therefore, it is easily understood from FIG. 3 that an initial charging rate of the battery charged at 4.0V (the curve Lf) is only 80% of that of the battery charged at 4.2V, but its total electrical capacity (the total operating period) significantly increases over time. In other words, the cycle life of the secondary battery (the lithium ion battery) and thus the total electrical capacity (the total operating period) significantly change depending on the charging rate of the battery.

In the present invention, based on the above charge and discharge cycle characteristic, when the secondary battery is less frequently used for driving an appliance, the cycle life is to be extended by lowering the charging voltage and suppressing the charging rate of the battery. On the other hand, when an opportunity to use the secondary battery for driving the appliance arises, the charging voltage is to be increased so as to increase the charging rate of the battery, in order to extend the operating period of the appliance driven by the secondary battery.

When the charging rate of the battery is changed, it is necessary to detect a charged level of the secondary battery. In the present invention, the charged level is obtained based on a value obtained by multiplying the battery voltage (the voltage detection signal S12a) mostly detected by the voltage detection circuit 12 with the charge and discharge current (the current detection signal S16a) detected by the current detection circuit 16.

When a request to increase the charging rate of the secondary battery is issued to the microcontroller 5 through the CPU 34, and the microcontroller 5 determines that the charged level of the battery pack 2 detected with the above method is lower than the requested charging rate, the microcontroller 5 outputs the charge control signal Sc1 to operate the charge circuit 6, and charges the secondary battery until the charged level reaches the requested charging rate.

On the other hand, when a request to decrease the charging rate of the secondary battery is issued to the microcontroller 5 through the CPU 34, and the microcontroller 5 determines that the charged level of the battery pack 2 detected with the above method is higher than the requested charging rate, the microcontroller 5 outputs the second charge control signal Sc2 to turn the switch 35 on, and discharges the battery pack 2 through the discharge resistor 36 until the charged level reaches the requested charging rate.

Furthermore, the microcontroller 5 outputs the third charge control signal Sc3 to control the charging mode display LED 37 so as to display a current charged level. For example, when the charging rate is high, the charging mode display LED 37 is turned off, whereas when the charging rate is low, the charging mode display LED 37 is turned on. Additionally, while the battery is being charged or discharged according to the charging rate having been changed by a user, the charging mode display LED 37 blinks. Thus, the present invention provides means for allowing the user to easily recognize the current charged level.

As described above, the present embodiment has been devised to achieve the two contrary objects, i.e., (1) extending the operating period of the secondary battery per charge, and (2) extending the cycle life (the total electrical capacity and the total operating period) of the secondary battery. In order to achieve these two objects, it is necessary to accurately control the charged level of the secondary battery. However, in a conventional method for controlling the charged level based on the charge capacity of the secondary battery, the objects cannot be achieved since the precision is reduced as characteristics of the secondary battery vary over time.

Specifically, in order to control the charging rate of the battery, a method for stopping the charge when the charge capacity of the battery (the remaining capacity of the battery) reaches 80% of the total charge capacity of the battery charged at 4.2V (defined as 100%) rather than reducing the charging voltage is often adopted. The charge capacity corresponding to 100% described above is referred to as a "fully charged capacity," and is previously stored in the EEPROM 33 as a unique value of the battery pack 2.

Then, the value stored in the EEPROM is updated such that a current fully charged capacity is set as an integral discharge capacity of the battery pack 2 discharged from a fully charged state to a fully discharged state. Specifically, if the battery pack 2 is often recharged before being completely discharged, the total integral discharge capacity of the battery pack 2 will be maintained or not stored as the fully charged capacity in the EEPROM 33 for a long period of time.

If the fully charged capacity always represents the current total capacity of the battery pack accurately, there is no problem if the charge is stopped when the remaining capacity of the secondary battery reaches 80% of the total charge capacity, as described above. However, due to deterioration, the fully charged capacity of the secondary battery is gradually reduced together with the decreasing cycle life. Therefore, if the fully charged capacity remains unupdated, even though the charge is stopped when the remaining charge capacity of the battery reaches 80% of the fully charged capacity which had initially been set, the actual charge capacity will be over 80% of a current total charge capacity, which is reduced due to the deterioration. Thus, the charging rate of the battery cannot be controlled as desired.

On the other hand, in the case where the charging rate of the battery is controlled based on the charging voltage, there is a problem that, for example, if the charge capacity of the battery charged at 4.0V is applied as it is to the fully charged capacity of the battery charged at 4.2V, the detected remaining capacity (%) of the battery fully charged at 4.0V is not correctly indicated. Therefore, generally, the "fully charged capacity of the battery charged at 4.0V" which is defined as 100% of the total charge capacity of the battery charged at 4.0V, is also provided, separately from the fully charged capacity of the battery charged at 4.2V. Thus, the fully charged capacity of the battery charged at each of 4.0V and 4.2V is to be indicated as "100%". However, even though the fully charged capacity of the battery charged at 4.0V and the fully charged capacity of the battery charged at 4.2V are both indicated as 100% individually, the actual charge capacity of the battery fully charged at 4.0V is less than that of the battery fully charged at 4.2V, whereby the respective secondary batteries have different operating period. Thus, a user may be confused by such an indication.

It is generally known that the charge capacity of the lithium ion battery decreases by approximately 1% as the charging voltage decreases by 10 mV. Furthermore, a ratio of the charging rate of the battery charged at 4.2V to that of the battery charged at 4.0V is approximately 1:0.8. Therefore, if the remaining capacities of the batteries fully charged at 4.2V and 4.0V were indicated as "100%" and "80%", respectively, the user would easily understand the indication.

In the present embodiment, based on the aforementioned fact, values of the "fully charged capacity of the battery charged at 4.2V" and the "fully charged capacity of the battery charged at 4.0V" are stored respectively in the EEPROM 33. Furthermore, when the battery is charged at 4.0V, the microcontroller 5 obtains a ratio of the "fully charged capacity of the battery charged at 4.0V" to the "fully charged capacity of the battery charged at 4.2V," whereby the remaining capacities of the batteries fully charged at 4.2V and 4.0V are to be indicated as "100%" and "80%," respectively.

More specifically, when it is assumed that the fully charged capacity of the battery charged at 4.2V is "FCC42", the fully charged capacity of the battery charged at 4.0V is "FCC40", and the current charge capacity is RC, a value of the remaining capacity of the battery charged at 4.2V is calculated in accordance with the following equation (1).

$$\text{RSOC (\%)} = \text{RC/FCC42} * 100 \quad (1)$$

Similarly, a value of the remaining capacity of the battery charged at 4.0V is calculated in accordance with the following equation (2).

$$\text{RSOC (\%)} = \text{RC/(FCC40/0.8)} * 100 \quad (2)$$

Thus, in the embodiment of the present invention, a user recognizes a charged level of the secondary battery (the lithium ion battery) by means of the charging mode display LED 37 controlled by the microcontroller 5. Then, the user issues a request to the charge control device so as to obtain a desired charging rate of the battery based on the recognized charged level. The microcontroller 5 compares the desired charging rate of the battery with a current charging rate of the battery, and if there is a difference between the two, the microcontroller 5 operates the charge circuit 6 to charge the battery pack 2. Furthermore, the microcontroller 5 operates the discharge resistor 36 to discharge the battery pack 2, thereby making it possible to rapidly change the charged level of the battery pack 2 to the desired charged level.

For indicating a remaining capacity of the battery in the usage condition where the charging rate is suppressed, a ratio of a current charge capacity to the maximum charge capacity is obtained, and the current charge capacity is displayed based on the ratio. Therefore, it becomes possible to clearly present the charged level to the user.

The present embodiment illustrates an example where software operates the microcontroller 5 to specify the charging rate through the CPU 34 as means for changing a charging mode. However, a hardware switch directly connected to the microcontroller 5 may be used as the means for switching the charging mode.

In the present embodiment, the lithium ion battery is described as an example. However, the present invention may be applicable to any secondary battery having similar charging characteristics to the lithium ion battery.

Second Embodiment

Figure 4:
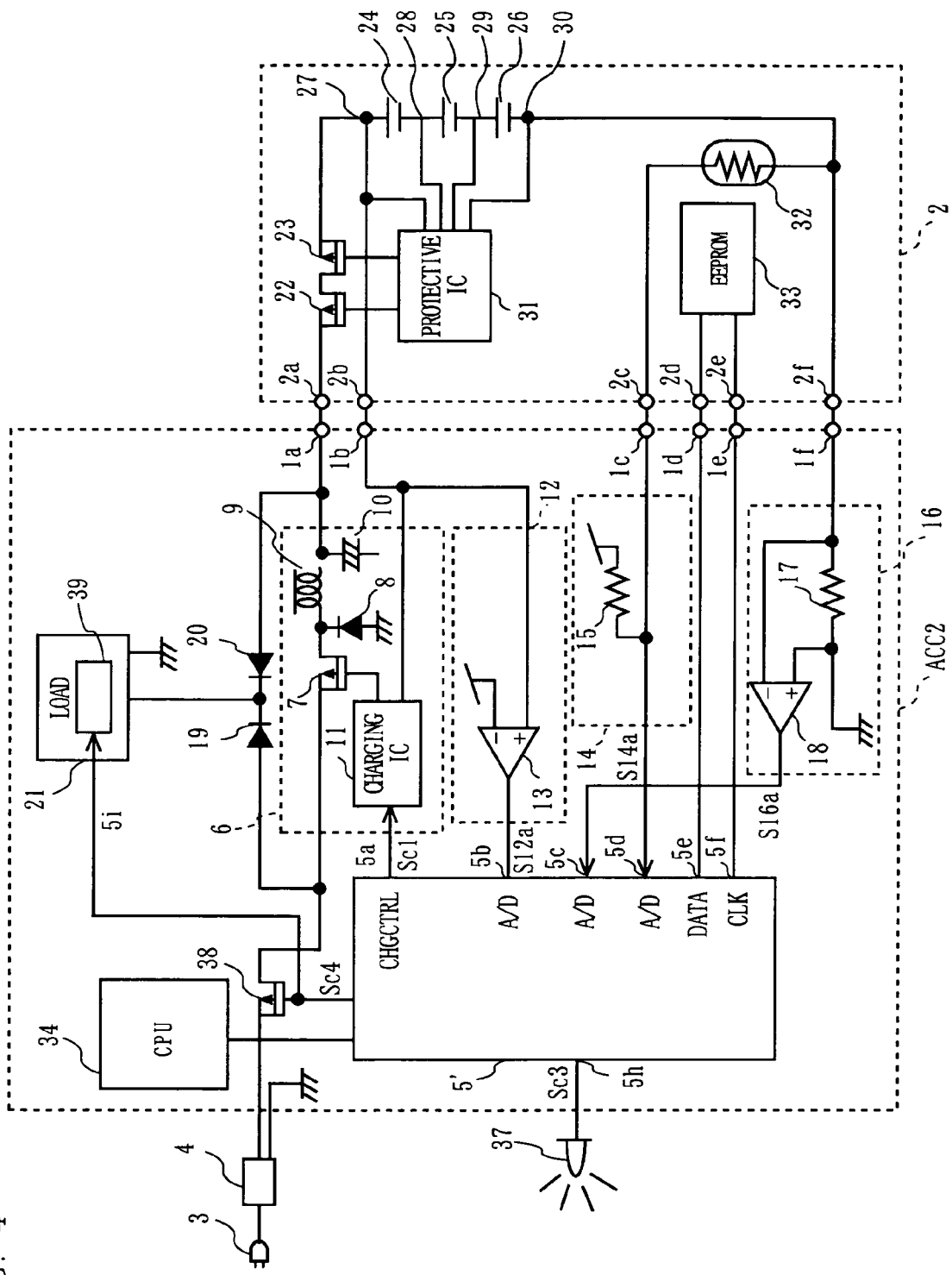
FIG. 4 is a block diagram illustrating a configuration of the charge control device according to a second embodiment of the present invention.

Hereinafter, with reference to FIG. 4, the charge control device according to a second embodiment of the present invention is described. Firstly, its basic concept is described. As shown in FIG. 4, the charge control device ACC2 in the second embodiment is different from the charge control device ACC1 shown in FIG. 1 in that the charge control device ACC2 further comprises the FET 38 between the power supply unit 4 and the charge circuit 6, and the load 21. Furthermore, the microcontroller 5 in the charge control device ACC1 is replaced with the microcontroller 5' in the charge control device ACC2. In addition to the first charge control signal Sc1 and the third charge control signal Sc3, the microcontroller 5' has a function of generating a fourth charge control signal Sc4, which controls the FET 38 and the power supply circuit 39 of the load 21. Note that the second control signal Sc2 is not to be generated.

In the charge control device ACC2, similarly to the microcontroller 5 in the charge control device ACC1, the microcontroller 5', when receiving a request to lower the charging rate of the secondary battery, detects the charged level of the battery pack 2 through the CPU 34. Then, when it is determined that the detected charged level of the battery pack 2 is higher than the requested charging rate, the microcontroller 5' outputs the fourth charge control signal Sc4 to turn the FET 38 off, and connects the power supply circuit 39 of the load 21 to the battery pack 2. As a result, a power supply from the power supply unit 4 to the charge circuit 6 is disconnected, and the battery pack 2 is discharged so as to reach the requested charging rate of the battery due to power consumption by the load 21. Thereafter, when the battery pack 2 is discharged to the desired charged level, the microcontroller 5' turns the FET 38 on.

Furthermore, upon receiving a request to lower the charging rate of the secondary battery when an appliance is not in operation, the microcontroller 5' outputs the fourth charge control signal Sc4 to turn the power supply circuit 39 on, and causes the power source to automatically turn the appliance on and discharge the secondary battery. Then, when the discharge is completed, the microcontroller 5' outputs the fourth charge control signal Sc4 again to turn the power supply circuit 39 off, and causes the appliance to automatically stop its operation.

As described above, in the present embodiment, there is an advantage that no special circuit is necessary to be provided for discharging the secondary battery. In the first embodiment, the discharge resistor 36 provided for discharging the battery pack 2 cannot be set to have a great discharge power due to the limited heat dissipation and the limited size of components. However, in the present embodiment, when the secondary battery is discharged by using a power generated during the operation of the appliance, a high power discharge is enabled, thereby making it possible to rapidly lower the charging rate so as to shift from a high charged state to a low charged state. Furthermore, it is very advantageous that when the charging rate is rapidly decreased, the deterioration of the secondary battery also can be prevented or reduced due to a power generated by discharging the secondary battery.

In the above embodiment, two charging voltages, i.e., 4.2V and 4.0V, of the secondary battery are illustrated. However, the lower the charging voltage is, the longer the cycle life becomes. As a result, the total electrical capacity of the secondary battery and the total operating period of the appliance both become longer. From this standpoint, it is desirable that the charging voltage be set at a voltage that is slightly higher than a minimum voltage at which the secondary battery can be charged. However, in the above case where a power supply from an external power source is disconnected and the appliance is driven only by the secondary battery, the operating period of the appliance will be considerably short. Thus, the above case may be considered unpractical.

However, the notebook computer is often used as a substitute of a desktop type personal computer (hereinafter, referred to as a "desktop computer") in a similar manner. That is, generally, the notebook computer often remains connected to the alternating-current commercial power source 3, and if required, the notebook computer is brought out to be used by utilizing the mounted secondary battery as a power supply. In this usage, the secondary battery of the notebook computer is usually maintained in the fully charged state by a power constantly supplied from the alternating-current commercial power source 3.

Specifically, the lithium ion battery (the secondary battery) is maintained in the fully charged state of 4.2V when the notebook computer is in use (when a power is supplied from the alternating-current commercial power source 3), whereas the lithium ion battery naturally discharges its power when the notebook computer is not in use. By a constant repetition of fully charging the battery and naturally discharging the battery, the cycle life of the lithium ion battery is considerably shortened. It is widely known that when the notebook computer is used in a condition where no alternating-current commercial power source 3 is available, energy in the lithium ion battery is being consumed to an extent of even making the battery unusable.

Therefore, in the charge control device according to the present invention, when the notebook computer, as a substitute of the desktop computer, is driven by the alternating-current commercial power source, the operating period of the appliance driven by the secondary battery becomes shorter by charging the secondary battery (the battery pack 2) at a charging voltage (Vcmin+α) which is higher by a predetermined value than the minimum voltage at which the secondary battery can be charged. However, the cycle life (the total electrical capacity and the total operating period) can be greatly improved. In this case, even if the alternating-current commercial power source connected to the notebook computer was suddenly disconnected due to an accident and the like, the secondary battery would function as an emergency power source to prevent a loss of data being processed on the notebook computer.

The present invention can be used for charging the secondary battery such as the lithium ion battery or any other batteries having similar charging characteristics as the lithium ion battery.

While the invention has been described in detail, the foregoing description is in all aspects illustrative and not restrictive. It is understood that numerous other modifications and variations can be devised without departing from the scope of the invention.

What is claimed is:

1. A charge control device comprising:
    a charge circuit for supplying a charging voltage (Vc) or a charging current (Ic) to a secondary battery used for driving an appliance;
    charged level setting means for switching a charged mode between a fully charged mode in which a fully charged state is a targeted charged state and a low charged mode in which a charged state whose charging rate is decreased by a predetermined percentage from that of the fully charged state is a targeted charged state;
    detection means for detecting a charged level of the secondary battery;
    discharge means for discharging the secondary battery;
    control means for operating the charge circuit while a charged level detected by the detection means is lower than a targeted charged state in the charged mode, which is currently selected by the charged level setting means, and operating the discharge means while a charged level detected by the detection means is higher than a targeted charged state in the charged mode, which is currently selected by the charged level setting means; and
    a storage device for storing a fully charged capacity of the secondary battery in the fully charged mode, and for storing a fully charged capacity of the secondary battery in the low charged mode,
    wherein in the low charged mode, a remaining capacity of the secondary battery is indicated in accordance with the following equation: $RSOC(\%) = RC/(FCC/CV)*100$,
    wherein RSOC is the remaining capacity of the secondary battery, RC is a current charge capacity of the secondary battery, FCC is the fully charged capacity of the secondary battery in the low charged mode, and CV is a conversion factor, and
    wherein the fully charged mode is a first constant-voltage charged mode in which the secondary battery is charged at a first voltage, and the low charged mode is a second constant-voltage charged mode in which the secondary battery is charged at a second voltage which is lower than the first voltage.

2. The charge control device according to claim 1, further comprising notification means for notifying a user of the remaining capacity of the secondary battery.

3. The charge control device according to claim 1, further comprising:
    temperature detection means for detecting a temperature of the secondary battery;
    calculation means for calculating a usage period of the appliance; and
    display means for prompting a user to change the charged level, either when the detected charged level is higher than a predetermined charged level and the detected temperature is higher than a predetermined temperature, or when the calculated usage period is longer than a predetermined period.

4. The charge control device according to claim 1, wherein the discharge means discharges the secondary battery through an operation of the appliance by disconnecting an external power supply to the appliance.

5. The charge control device according to claim 4, further comprising power source control means for controlling a power source of the appliance,
    wherein when the appliance is not in operation and a predetermined charged level is lower than the detected charged level, the power source control means automatically turns on the power source of the appliance to discharge the secondary battery, and when the discharge is completed, the power source control means automatically stops the operation of the appliance.

6. The charge control device according to claim 1, wherein the charged level setting means sets a charging voltage which is higher by a predetermined value ($\alpha$) than a minimum voltage (Vcmin) at which the secondary battery can be charged, and causes the secondary battery to be charged to a predetermined charged level.

7. The charge control device according to claim 6, wherein the charged level setting means causes a charge of the secondary battery to stop when the secondary battery is charged to the predetermined charged level, and causes the secondary battery to drive the appliance.

8. The charge control device according to claim 7, wherein the charged level setting means causes the charge of the secondary battery to resume immediately before the secondary battery is completely discharged.

9. The charge control device according to claim 1, wherein the predetermined percentage is greater than 0% and less than 100%.

10. The charge control device according to claim 1, wherein the charged level setting means is controlled by a user.

11. The charge control device according to claim 1, wherein the first voltage is 4.2 volts and the second voltage is 4.0 volts.

12. The charge control device according to claim 11, wherein the conversion factor is 0.8.

13. The charge control device according to claim 1, wherein said storage device is an EEPROM.

* * * * *